United States Patent Office 2,852,477
Patented Sept. 16, 1958

2,852,477

COMPOSITIONS OF POLYAMIDES AND POLYEPOXIDE POLYESTERS

Sylvan O. Greenlee, Racine, Wis., assignor to S. C. Johnson & Son, Inc., Racine, Wis.

No Drawing. Application June 29, 1955
Serial No. 518,977

11 Claims. (Cl. 260—22)

This invention relates to new compositions resulting from the reaction of polyepoxide polyesters and polyamide resins and includes the initial reaction mixtures as well as the intermediate and final reaction products derived therefrom. The polyepoxide polyesters used in preparing these new compositions are the polyepoxide polyesters which may be produced by epoxidizing the polyesters of tetrahydrophthalic acid and glycols. The polyamides employed are the resinous polymers formed by amidifying dibasic acids such as the dimers of unsaturated animal and vegetable oil acids. Reaction products derived from the reaction of these polyepoxide polyesters and polyamide resins are valuable compositions for the manufacture of films, adhesives, coating compositions, molded articles, etc.

An object of this invention is to provide new compositions containing polyepoxide polyesters and polyamide resins in such proportions that they may undergo further reaction to form more highly polymerized complex products.

Another object of this invention is to provide reaction products from mixtures of polyepoxide polyesters and polyamide resins which are valuable materials in the manufacture of films, molded articles, coating compositions, etc., and which may be prepared so as to have flexibility, toughness, and good chemical resistance.

Another object of this invention is to provide new compositions of the hereinbefore described character which are prepared using polyepoxide polyesters which may be selected with a relatively high degree of epoxidation so that in the polymerization with the polyamides, cross-linked complex polymers are readily formed.

These and other objects and advantages are attained by this invention, various other advantages and novel features of which will become more fully apparent from the following description, with particular reference to specific examples which are to be considered as illustrative only.

The polyepoxide polyesters used in this invention for reaction with the polyamide resins may be conveniently prepared by epoxidizing the polyesters formed in the esterification of tetrahydrophthalic anhydride and glycols. The anhydride form of the acid is usually used since esterification proceeds easily with the anhydride and since the anhydride is readily available commercially although, of course, the acid could be used. The polyesters may also be prepared by the reaction between glycols and simple esters of tetrahydrophthalic acid such as dimethyl or diethyl esters. This latter reaction would involve alcoholysis, or the displacing of the ethyl or methyl alcohol residue in the simple ester by the appropriate glycol.

Glycols which may be used in the preparation of the polyesters with tetrahydrophthalic anhydride include such glycols as ethylene glycol, diethylene glycol, tetramethylene glycol, propylene glycol, polyethylene glycols, neopentyl glycol, and hexamethylene glycol, as well as the longer-chain glycols such as the 36-carbon glycol prepared by the sodium or catalytic reduction of the simple esters of dimerized 18-carbon soybean oil acids. Since with tertiary glycols there is a tendency for dehydration to occur under the conditions necessary for esterification with the subsequent formation of a double bond, generally the primary and secondary glycols are the most satisfactory in the polyester formation.

The degree of polymerization occurring during the polyester formation may be controlled by properly regulating the proportions of tetrahydrophthalic anhydride and glycol in the esterification reaction. Any excess acidity or hydroxyl content present in the polyester reaction mixture may be neutralized by reaction with a monofunctional alcohol or acid, respectively, and by properly selecting the monofunctional reactant, slightly different properties may be given to the resulting polyester compositions.

Polyepoxide polyesters may be prepared from these polyesters by epoxidizing the unsaturated portions of the tetrahydrophthalic acid residues in the polyester composition. These polyepoxide polyester compositions as well as their preparation are more fully described in a copending application having Serial No. 503,323, filed April 22, 1955.

The number of epoxide groups per molecule and the molecular weight of the polyepoxide polyester composition may be controlled by adjusting the degree of polymerization which takes place, regulating the extent of the epoxidation of the polyester, and by proper selection of the glycol used in the esterification reaction with tetrahydrophthalic acid. For instance, the epoxidized polymer formed by epoxidizing the polyester of a long-chain glycol and tetrahydrophthalic anhydride would have a lower degree of epoxidation per given weight than the epoxidized polymer formed by epoxidizing the polyester prepared with a shorter-chain glycol, and the molecular weight of each of these compositions may be controlled by regulating the degree of polymerization in the polyester formation. Polyepoxide polyester compositions having up to 12 or more epoxide groups per molecule have been found to be useful in formulating the compositions herein described. The polyepoxide polyesters used herein may have varying structures so long as they do not contain functional groups which interfere with the reaction of the polyepoxide and the polyamide resins.

The polyamide resin compositions used in this invention with the polyepoxide polyester resins are derived in general by amidifying dibasic acids such as the dimers of undecenoic acid, or the dimers of unsaturated animal and vegetable oil acids which are unsaturated aliphatic acids having about 18 to 22 carbon atoms and which include such acids as soyabean, linseed, or cotton seed oil acids, and animal fat or fish oil acids. Dibasic acids having 22 or more carbon atoms may be prepared from these unsaturated aliphatic materials by methods which are well known to form polymeric materials which are essentially dimers. In the polymerization of these acid materials, the reaction products contain a mixture of unreacted monomers, dimers, and higher polymers, the predominant constituent being, however, dibasic acid dimers formed by the combination of two unsaturated acids through their olefin groups. The polymerization products may be purified by such methods as distillation or solvent extraction so as to obtain a higher concentration of the dibasic acid dimers, or the polymerization products may be amidified directly without purification in the preparation of the polyamides of this invention.

The amidification of these dibasic acids with aliphatic diamines may be carried out under the usual conditions employed for amidification. The diamines used in this invention in the amidification are the aliphatic diamines in which the amine groups of the diamine are either primary or secondary type amine groups. These diamines contain active hydrogen, that is, hydrogen atoms attached to the nitrogen atom of the amine group, and these active hydrogens will react with the polymerized unsaturated acids to form polymerized polyamide compositions. Typical of the commercially available aliphatic diamines useful in this invention are such diamines as ethylenediamine and hexamethylenediamine. Polyamines such as triamines are ordinarily not too satisfactory in the preparation of the polyamides used in this invention because of their basic character which tends to destroy the polyepoxide polyesters in the reaction of the polyamides with the polyesters to form more complex reaction products. Ordinarily in those cases where the longer-chain acids are employed, diamines having 10 carbon atoms or less give the most valuable reaction products.

By way of illustration, the reaction of the diamines with these dibasic acid materials may be shown by the following equation where the dimer acid formed by polymerizing linoleic acid is amidified with ethylene diamine:

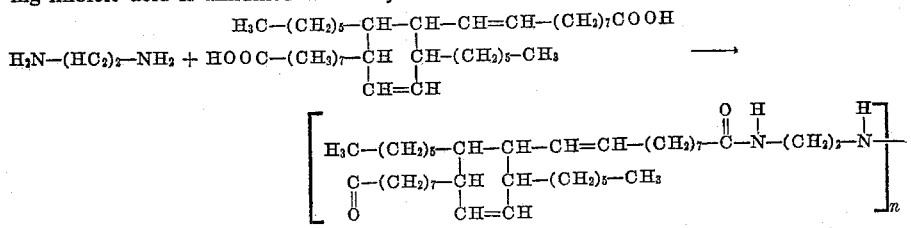

where $n$ represents the number of recurring amide groups present in the polymerized product. Polyamides having molecular weights up to 10,000 and having 10 or more recurring amide groups may thus be readily prepared.

It is possible to produce in the amidification of the dibasic acids polyamide resins having terminal amine groups or terminal carboxyl groups or mixtures of both. The molecular weight of the polyamide resin may be controlled by adjusting the degree of polymerization which occurs during the amidification, and by properly selecting the diamine or the dibasic acids employed in the amidification reaction. In this way, the molecular weight of the resinous polyamide product may be regulated in much the same way as that used in the preparation of the polyepoxide polyesters employed in this invention. The polyamide resin products of the amidification will contain hydrogen atoms attached to oxygen in the terminal carboxyl groups and/or attached to nitrogen in the terminal amide groups, as well as hydrogen attached to nitrogen of the amine groups present in the composition, provided, of course, that the diamines used in the amidification contain some primary amine groups. These hydrogen atoms are active hydrogens and will react with epoxide groups of the polyepoxide polyesters to form the more highly polymerized, cross-linked compositions of this invention.

The degree of polymerization occurring in the polyamide resin formation may be regulated by properly regulating the proportions of the dibasic acid and diamine in the amidification reaction. Excess acidity or amine content in the reaction mixture may be reacted with monofunctional acid or amines and in this manner slightly different properties may be given to the polyamide resin formed.

The reactions which take place between the polyamide resins and the polyepoxide polyesters appear complex, and it is desired not to limit this invention by any theoretical explanation of the nature of the reactions which take place. However, it seems probable that in addition to a reaction between the epoxide groups of the polyepoxide and the active hydrogens of the polyamide, there is further amidification of any unreacted acid in the mixture. Also, it seems likely that there be a reaction between epoxide groups present with active hydrogen contained by hydroxyl groups formed in the polyepoxide polyester in the course of the reaction of epoxide groups with other active hydrogens. These reactions may take place at various rates of reaction, to yield a polymerized product which is valuable in the manufacture of coating compositions, molded articles, adhesives, etc.

The reactivity of the polyepoxide polyesters used in this invention depends to a certain extent on the weight of the composition per an epoxide group, or the equivalent weight of the polyepoxide polyester. Those polyepoxide polyesters having a low equivalent weight, are usually more reactive in the reaction with the resinous polyamides than those polyepoxide polyesters having a higher equivalent weight per epoxide group. Where a slow curing or a relatively plastic composition is desired, it may be advantageous to react a polyepoxide polyester having a fairly high equivalent weight per epoxide group with a resinous polyamide having a relatively small amount of active hydrogen. By selecting a polyepoxide having a lower equivalent weight per epoxide group, an opportunity is provided for several linear polyepoxide polyester chains to interact with each other and to react with the polyamides to produce a net-like structure having harder and tougher properties.

In preparing the new compositions of this invention, the polyamide and the polyepoxide polyester resins may be used with each other in regulated proportions and without the addition of other constituents. Admixtures can be prepared, however, by including into the mixture other constituents such as filling and compounding materials, plasticizers, pigments, etc. This use of a plasticizer, for instance, may be advantageous when the compositions after they are finally converted tend to give somewhat brittle products.

The constituents which may be added generally can be divided into inert type constituents as illustrated by pigments useful in the formulation of enamels, and certain plasticizer compositions; or they may be internal type constituents. The latter type may be illustrated by such materials as plasticizers having functional groups which would enter into a reaction with active hydrogen or epoxide groups present in the compositions of this invention and be carried chemically by the composition.

The method of blending polyamide and polyepoxide resins together would depend somewhat on their properties such as mutual softening points or solubility. For certain applications, it may be convenient to use polyamides which have been polymerized only slightly and have soft, syrupy textures. In this state the polyamide and the polyepoxide polyesters, which are frequently syrupy in texture, can be mixed without the use of solvents or raised temperatures. Should the resins have melting points higher than room temperature, it would be necessary to mix the resins using a solvent or elevated temperatures. In the preparation of molded objects, a molten mixture of resins could be poured directly into a mold and then be converted at elevated temperatures, probably in the range of 150° C. or higher. In those instances where a protective coating is being prepared, it is often desirable to dissolve a mixture of the two resins in a suitable organic solvent. Solvent solutions offer the advantage of reducing the temperature required to mix the two types of resins together, and also offer an opportunity for adjusting the viscosity of the mixture so as to obtain a material which may be easily applied as a coating.

There is considerable variation in the relative proportions of the polyamide resins and the polyepoxide resins which may be used. These proportions would vary to some extent on the active hydrogen content or the epoxide content of the resins, however, generally it may be said that products prepared from mixtures which have a high concentration of the polyamide resin tend to be more plastic, almost resilient, whereas resin mixtures having a high concentration of polyepoxide polyseter resins would tend to give tougher, harder, reaction products.

Once the resin mixtures have been prepared, conversion of the mixture to a more highly polymerized complex product can be brought about by raising the temperature of the mixture sufficiently in order to allow the coupling reaction to take place. In those cases where it is desired to have a short curing time after the resin mixture is finally applied, it may be advantageous to partially react the resin mixtures and dissolve the partially reacted product in a suitable solvent. This solvent solution would be essentially tack-free on evaporation of the solvent, yet it would be soluble and fusible at this stage and could be further converted by the application of more heat.

Since the compositions of this invention have excellent flexibility and good chemical resistance to such materials as alkali and boiling water, they are well suited for the manufacture of varnishes and protective coatings. Molded objects prepared from the compositions have hard, glossy surfaces while retaining their flexibility. The compositions of this invention are also important in the lamination and impregnation of such materials as plastic sheets, wood, glass, etc.

The following examples will serve to illustrate the invention, however, it should be understood that the invention is not intended to be limited thereby. In these preparations, proportions expressed are parts by weight unless otherwise indicated.

Examples I through III will illustrate the preparation of polyamide condensation products which are employed in this invention.

Example I

In a 3-liter, 3-neck flask provided with a mechanical agitator, thermometer, and water trap with a reflux condenser was placed 1545 parts of Emery Dimer Acid No. 955 and 269 parts of an aqueous solution containing 70% ethylenediamine. The specifications of this dimer acid, which is essentially a 36-carbon atom acid, as given by the manufacturer, Emery Industries, Inc., are:

| | |
|---|---|
| Iodine value (modified Wijs method) | 80–95 |
| Acid value | 180–192 |
| Saponification value | 185–195 |
| Neutralization equivalent | 290–310 |

The flask was provided with an inlet for inert gas, and in an atmosphere of nitrogen gas, the reaction mixture was heated with continuous agitation from 94° C. to 220° C. over a period of 12 hours. During this period 165 parts of water were removed from the reaction mixture. The resulting polyamide resin had an acid value of 3.2 and a softening point of from 87° C. to 89° C. (Durrans' mercury method).

Acid value as used herein represents the number of milligrams of KOH equivalent to the acidity present in a one-gram sample.

Example II

In a 1 liter, 3-neck flask provided with an agitator, thermometer, and water trap with reflux condenser was placed 309 parts of Emery Dimer Acid No. 955 and 111 parts of an aqueous solution containing 70% hexamethylene diamine. This mixture was heated over a period of 12 hours as in Example I with the removal of water to yield a polyamide resin having an acid value of 15.1 and a softening point of from 70° C. to 71° C.

Example III

In a 500 milliliter, 3-neck flask, 154 parts of Emery Dimer Acid No. 955 and 83 parts of an aqueous solution containing 70% hexamethylene diamine was treated over a period of 12 hours as in Example I with the removal of water to yield a polyamide resin having an acid value of 15.0 and a softening point of from 74° C. to 75° C.

Example IV illustrates the preparation of a typical polyepoxide polyester resin from tetrahydrophthalic anhydride and the glycol, 1,4-butanediol.

Example IV

In a 3-neck flask provided with a thermometer, a mechanical agitator, and reflux condenser attached through a water trap was placed a mixture of 1.1 mol tetrahydrophthalic anhydride and 0.2 mol n-butanol. After melting the tetrahydrophthalic anhydride in the presence of the butanol, 1 mol of 1,4-butanediol was added. The reaction mixture was gradually heated with agitation to 225° C. at which point a sufficient amount of xylene was added to give refluxing at esterification temperature. The reaction mixture was then heated with continuous agitation at 225–235° C. until the acid value decreased to 8.6, a period of about 24 hours. The product, a polyester resin, was a highly viscous, tacky material having slight flow at room temperature.

A dehydrated form of a salt-splitting, styrene-divinylbenzene copolymer type cation exchange resin (Dowex 50, produced by Dow Chemical Company) was prepared by washing the alkali salt form of the resin several times with 4 to 6 normal hydrochloric acid, followed by washing the resin with water and drying the product in a vacuum oven at temperatures of approximately 80° C. for 16 hours.

In a 3-neck flask provided with a thermometer, a mechanical agitator, and a reflux condenser was placed 107 parts of the dehydrated cation exchange resin and 30 parts glacial acetic acid. The mixture of cation exchange resin and acetic acid was allowed to stand until the resin had completely taken up the acid. To this mixture was added 273 parts nonvolatile of the polyester resin dissolved in an equal weight of xylene.

To the continuously agitated reaction mixture was added dropwise over a period of 45 minutes to 1 hour 75 parts of 50% hydrogen peroxide. The reaction temperature was held at 60° C. requiring the application of some external heat, until a milliliter sample of the reaction mixture analyzed less than 1 milliliter of 0.1 N sodium thiosulfate in an iodometric determination of hydrogen peroxide. The product was then filtered, finally pressing the cation exchange resin filter cake. The acid value of the total resin solution was 56.9. The percent nonvolatile of this solution, amounting to 559 parts, was 50.

A dehydrated form of an amine type, salt-splitting anion exchange resin (Dowex I produced by Dow Chemical Company) was prepared by neutralizing the acid salt form of the resin with alkali, followed by washing the resin with water and drying the product in a vacuum oven at a temperature of approximately 80° C. for 16 hours.

The 559 parts of solution was thoroughly mixed with 175 parts of the dehydrated basic form of Dowex 1. The resulting mixture was then filtered followed by pressing as much of the solution as possible from the anion exchange resin cake. This product had an acid value of 10.1 on the nonvolatile resin content, and an epoxide equivalent (equivalent weight to epoxide group) of 304 on the nonvolatile resin content.

The epoxide values as discussed herein were determined by refluxing for 30 minutes a 2-gram sample with 50 milliliters of pyridine hydrochloride in excess pyridine. The pyridine hydrochloride solution was prepared by adding 20 millilters of concentrated HCl to a liter of pyridine. After cooling to room temperature, the sample is then back-titrated with standard alcoholic sodium hydroxide.

This resin solution is satisfactory for many uses, such as blending with active hydrogen compositions to make coating resin solutions ready for application. In cases where the solvent-free resin is desired, the solvent may be readily removed by distillation, preferably at reduced pressure under conditions where the temperature does not rise above around 60° C.

The following examples illustrate the preparation of more highly polymerized, complex products from mixtures of polyamide resins and polyepoxide polyester resins. In these examples, the resin mixtures were dissolved in an equal weight of a lacquer type solvent prepared from 18 parts xylene and 1 part Cellosolve to give a suitable varnish composition for the formation of films such as may be used for protective coatings. As shown by the examples, these films after curing were hard and flexible, in addition to having markedly good chemical resistance. These characteristics make the cured reaction products of this invention valuable in the manufacture of other products such as molded objects, although in such an application ordinarily no solvent would be used.

Example V

Films were prepared from a mixture of 170 parts nonvolatile of the product of Example II and 157 parts nonvolatile of the product of Example IV and cured at 175° C. for 30 minutes. These cured films were tack-free, hard, and flexible, and exhibited no deterioration when exposed to 5% aqueous sodium hydroxide for 40 hours or to boiling water for 4 hours, although the films became somewhat cloudy after 10 minutes exposure to boiling water.

Films were prepared from mixtures where the proportions of Example II was adjusted to 85 parts nonvolatile and 340 parts nonvolatile, respectively. These films were cured at 175° C. for 30 minutes, and showed similar resistance to 5% alkali and to boiling water.

Example VI

A polyester was prepared as in Example IV from 1.1 mols of tetrahydrophthalic anhydride, 1 mol of diethylene glycol, and 0.2 mols of n-butanol, the polyester having an acid value of 3.9 and an iodine value of 101. 250 parts nonvolatile of this polyester was epoxidized and freed from unreacted acid as in Example IV to yield a polyepoxide polyester having an epoxide equivalent of 314 and an acid value of 13.2, both values being based on the nonvolatile content.

Films were prepared from a mixture of 134 parts nonvolatile of this polyepoxide polyester and 157 parts nonvolatile of the product of Example I, and cured for 30 minutes at 175° C. These films were tack-free, hard and flexible, and although the film showed some cloudiness after 15 minutes' exposure to boiling water, no deterioration was observed on exposure to 5% sodium hydroxide for 28 hours or exposure to boiling water for 20 hours.

Similar results were observed when the concentration of the product of Example I was reduced to 79 parts nonvolatile, and when the concentration of Example I was increased to 314 parts nonvolatile.

Example VII

A polyester was prepared as in Example IV from 3 mols of tetrahydrophthalic anhydride, 2 mols of ethylene glycol, and 2 mols of n-butanol, the polyester having an iodine value of 100 and an acid value of 4. 252 parts nonvolatile of this polyester was epoxidized and freed from unreacted acid as in Example IV to yield a polyepoxide polyester having an epoxide equivalent of 268 and an acid value of 6, both values being based on the nonvolatile content.

Films were prepared from a mixture of 157 parts nonvolatile of this polyepoxide polyester and 43 parts nonvolatile of the product of Example III and cured for 30 minutes at 185° C. Tack-free, flexible films were obtained which withstood 5% aqueous alkali for 46 hours and boiling water for 3 hours without deterioration.

Similar results were obtained from mixtures prepared by changing the concentration of Example III to 85 parts nonvolatile and 170 parts nonvolatile, respectively.

Example VIII

An aldehyde-amide resin was prepared by refluxing with continuous agitation in a 3-liter, 3-neck flask provided with a mechanical agitator, thermometer, and reflux condenser a mixture of 120 parts of urea, 600 parts of 37% aqueous formaldehyde, and 1040 parts of n-butyl alcohol. the refluxing was continued for 1 hour, after which a water trap filled with toluene was placed between the reflux condenser and flask. Refluxing was then continued until 340 parts of water were removed from the reaction mixture.

Films were prepared from a mixture of 31 parts nonvolatile of this aldehyde-amide condensation product, 157 parts nonvolatile of the product of Example I, and 157 parts nonvolatile of the polyepoxide polyester prepared in Example VI. These films were cured for 30 minutes at 185° C. to yield a smooth, tack-free film which clouded soon after exposure to boiling water but which withstood deterioration in 5% alkali for 24 hours and boiling water for 10 hours.

In a similar manner, other compositions can be prepared using other polyepoxide polyester compositions and other polyamine resins. If desired, these compositions may be prepared using various other materials which may be chemically carried by the cured compositions such as urea-formaldehyde condensates, or by including in the mixture inert type constituents such as pigments, fillers, or plasticizers. Small amounts of urea-formaldehyde condensates, for example, may be used advantageously to improve the covering ability of the composition so that smoother and better-appearing films may be obtained in certain instances.

In these preparations of polyamide resins using ethylenediamine and hexamethylene diamine in conjunction with a dibasic acid, the polyamide formed contained two active hydrogens in each of the recurring amide units in the polymerized polyamide, these hydrogens being the residual hydrogens attached to the pair of nitrogens in the amine nucleus remaining in the polyamide. The polyamide would also contain active hydrogens as part of a carboxyl group in those cases where the polyamide is terminated by an acid nucleus, and active hydrogens as part of an amine or amide group when the polyamide is terminated by a diamine nucleus. In general, excellent conversion products were obtained from mixtures of polyepoxide polyester resins and polyamide resins where the ratio of epoxide groups present to active hydrogen ranged from 5 epoxide groups per active hydrogen to 5 active hydrogens per epoxide group. Since the active hydrogens present include hydrogens in the terminal acid nuclei or the terminal diamine nuclei present in the polyamide, polyamides prepared from primary amines which have been polymerized only slightly, i. e., those having only 2 or 3 recurring amide units, would tend to have a larger ratio of active hydrogens per recurring amide unit than those which have been polymerized more highly. Generally, however, those polyamides which have been polymerized so as to have 6 or more recurring amide units would contain in the range of 2 or 3 active hydrogens per recurring amide unit.

The excellent chemical resistance as well as the hard, but flexible properties exhibited by the above examples make the compositions of this invention useful in other applications where such properties are desirable. For instance, the compositions may be used not only in varnish type solutions where the initial mixture of resins, or partially reacted mixture of resins, is dissolved in a solvent and then applied, but may also be used without the use of any solvent. In the preparation of molded articles ordinarily no solvent would be necessary as the fused resins could be mixed directly in a mold. When the resin mixtures are used in the preparation of an adhesive, a solvent may or may not be desirable, depending to some extent on the melting point of the materials.

It should be understood that while there has been described but a limited number of embodiments of this invention, it is desired that this invention not be limited thereto, but that it is intended that all modifications be covered which would be apparent to one skilled in the art and that come within the scope of the appended claims.

It is claimed and desired to secure by Letters Patent:

1. A reaction mixture for forming complex reaction products comprising a polyamide of dibasic acids having at least about 22 carbon atoms and an aliphatic diamine containing at least one active hydrocarbon atom attached to each amino nitrogen, and a polyepoxide polyester of tetrahydrophthalic acid and a glycol free from aromatic groups, said polyester containing epoxy oxygen bridging adjacent carbon atoms on the tetrahydrophthalic acid residue, the ratio of epoxide groups present in said polyepoxide polyester to active hydrogen present in said polyamide ranging from 5:1 to 1:5.

2. A reaction mixture for forming complex reaction products comprising a polyamide of dibasic acids having at least about 22 carbon atoms and ethylenediamine, and a polyepoxide polyester of tetrahydrophthalic acid and a glycol free from aromatic groups, said polyester containing epoxy oxygen bridging adjacent carbon atoms on the tetrahydrophthalic acid residue, the ratio of epoxide groups present in said polyepoxide polyester to active hydrogen present in said polyamide ranging from 5:1 to 1:5.

3. A reaction mixture for forming complex reaction products comprising a polyamide of dibasic acids having at least about 22 carbon atoms and hexamethylenediamine, and a polyepoxide polyester of tetrahydrophthalic acid and a glycol free from aromatic groups, said polyester containing epoxy oxygen bridging adjacent carbon atoms on the tetrahydrophthalic acid residue, the ratio of epoxide groups present in said polyepoxide polyester to active hydrogen present in said polyamide ranging from 5:1 to 1:5.

4. A reaction mixture for forming complex reaction products comprising an active hydrogen containing polyamide of dibasic acid dimers of unsaturated oil acids, and an aliphatic diamine containing at least one active hydrogen atom attached to each amino nitrogen, and a polyepoxide polyester containing free epoxide groups of tetrahydrophthalic acid and a glycol free from aromatic groups, said polyester containing epoxy oxygen bridging adjacent carbon atoms on the tetrahydrophthalic acid residue, said mixture containing from 5 epoxide groups per active hydrogen to 5 active hydrogens per epoxide group.

5. The reaction mixture of claim 4 wherein said aliphatic diamine is ethylenediamine.

6. The reaction mixture of claim 4 wherein said aliphatic diamine is hexamethylenediamine.

7. Process for preparing complex reaction products which comprises preparing a mixture of a polyamide of dibasic acids having at least about 22 carbon atoms and an aliphatic diamine containing at least one active hydrogen atom attached to each amino nitrogen, and a polyepoxide polyester of tetrahydrophthalic acid and a glycol free from aromatic groups, said polyester containing epoxy oxygen bridging adjacent carbon atoms on the tetrahydrophthalic acid residue, the ratio of epoxide groups present in said polyepoxide polyester to active hydrogen present in said polyamide ranging from 5:1 to 1:5, and heating said mixture so as to convert the mixture into a more highly polymerized product.

8. Process of preparing complex reaction products which comprises preparing an organic solvent solution of a polyamide of dibasic acids having at least about 22 carbon atoms and an aliphatic diamine containing at least one active hydrogen atom attached to each amino nitrogen, and a polyepoxide polyester of tetrahydrophthalic acid and a glycol free from aromatic groups, said polyester containing epoxy oxygen bridging adjacent carbon atoms on the tetrahydrophthalic acid residue, the ratio of epoxide groups present in said polyepoxide polyester to active hydrogen present in said polyamide ranging from 5:1 to 1:5, and heating said mixture so as to obtain a more highly polymerized product.

9. The process of claim 8 wherein said mixture is heated at a temperature of at least 150° C.

10. Process of preparing complex reaction products which comprises preparing a mixture of a polyamide of dimers of unsaturated oil acids having at least about 18 carbon atoms and ethylenediamine, and a polyepoxide polyester of tetrahydrophthalic acid and a glycol free from aromatic groups, said polyester containing epoxy oxygen bridging adjacent carbon atoms on the tetrahydrophthalic acid residue, said mixture containing from 5 epoxide groups per active hydrogen to 5 active hydrogens per epoxide group, and heating said mixture so as to obtain a more highly polymerized product.

11. Process of preparing complex reaction products which comprises preparing a mixture of a polyamide of dimers of unsaturated oil acids having at least about 18 carbon atoms and hexamethylenediamine, and a polyepoxide polyester of tetrahydrophthalic acid and a glycol free from aromatic groups, said polyester containing epoxy oxygen bridging adjacent carbon atoms on the tetrahydrophthalic acid residue, said mixture containing from 5 epoxide groups per active hydrogen to 5 active hydrogens per epoxide group, and heating said mixture so as to obtain a more highly polymerized product.

References Cited in the file of this patent

UNITED STATES PATENTS

| | | |
|---|---|---|
| 2,337,834 | Peters | Dec. 28, 1943 |
| 2,498,533 | Dimpfl | Feb. 21, 1950 |
| 2,660,563 | Barnes et al. | Nov. 24, 1953 |
| 2,663,649 | Winkler | Dec. 22, 1953 |
| 2,705,223 | Renfrew et al. | Mar. 29, 1955 |